(No Model.)
C. G. F. HANKE & E. RICHTER.
MUSICAL GAME APPARATUS.
No. 484,589. Patented Oct. 18, 1892.
Fig. 1.
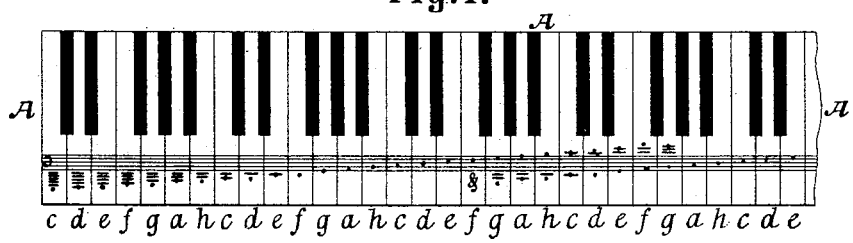
Fig. 2.     Fig. 2a.
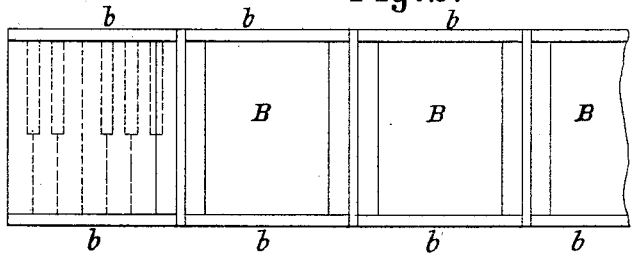 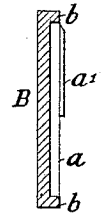
Fig. 3.
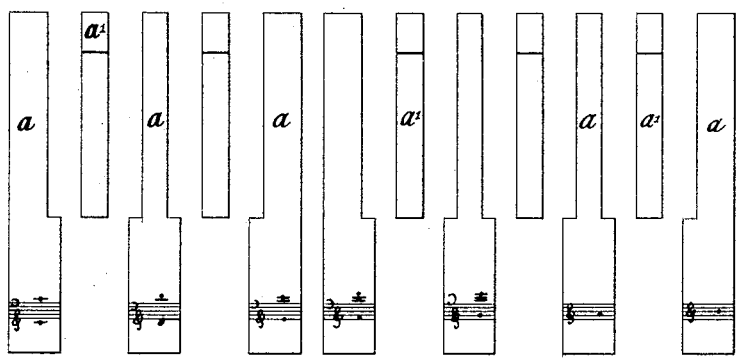
Fig. 4.     Fig. 5.
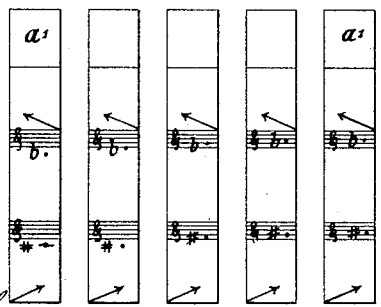 

UNITED STATES PATENT OFFICE.

CARL GOTTLIEB FERDINAND HANKE, OF RATIBOR, AND EMIL RICHTER, OF CZEKALSKI, GERMANY.

MUSICAL-GAME APPARATUS.

SPECIFICATION forming part of Letters Patent No. 484,589, dated October 18, 1892.

Application filed May 10, 1892. Serial No. 432,450. (No model.)

*To all whom it may concern:*

Be it known that we, CARL GOTTLIEB FERDINAND HANKE, residing at Ratibor, in the county of Silesia, Prussia, and EMIL RICHTER, residing at Czekalski, near Posen, in the province of Posen, Germany, subjects of the King of Prussia, have invented certain new and useful Improvements in Games for Learning the Denominations of Notes and Keys of Musical Instruments, of which the following is a specification.

This invention relates to improvements in games for learning the denominations of notes and keys of a musical instrument; and the object of the game, which may be called a "piano a b c," is to turn the mind and fancy of a child to music, so that in time the child will not only learn easily and rapidly the denominations of notes and keys, but that its eye and ear will be drilled for music.

The invention consists in the various features of improvement more fully pointed out in the claims.

In the accompanying drawings, Figure 1 is a face view of a portion of the pattern-card A; Fig. 2, a plan of base-plate B; Fig. 2$^a$, a cross-section of the base-plate with the keys inserted; Fig. 3, a face view of the detached keys of the fourth octave of the piano. Fig. 4 illustrates the key-plates of the black or upper keys of this octave with their denominations thereon, on an enlarged scale. Fig. 5 represents a plan and cross-section of a modification of the black keys.

The letter A represents the pattern-card, that serves as a guide in placing the keys upon the base-plate. This pattern-card illustrates the keys or finger-board of a piano, and each key is provided with its respective note, Fig. 1. The base-plate B is composed of several hinged sections provided with rims or flanges $b$, Figs. 2 and 2$^a$, between which the independent or disconnected key-plates or key-molds $a$ and $a'$, Figs. 3 and 4, may be inserted. The key-plates $a$ for the white or lower keys and the key-plates $a'$ for the black or upper keys are, as far as the form is concerned, equal for each octave, but they differ with each other by the different notes marked thereon, each key-plate being provided with its peculiar note. The key-plates or key-molds $a$ $a'$ may be manufactured of any suitable material and their form and thickness may be varied according to circumstances.

The rules for the game are as follows: The player has to put the key-plates $a$ or $a'$, according to the pattern-card A, correctly upon the board B between the flanges $b$, Fig. 2$^a$. The notes marked on the pattern-card and on the different key-plates will give the proper direction or assistance as to the placing of the key-plates. After a child has attained a certain skill in composing the keyboard on the plate B it may try to place the key-plates $a$ and $a'$ directly upon the corresponding keys of the finger-board of a piano or other musical instrument. The key thus covered in proper manner may then be sounded for training the ear. After this there must be given to the child the further explanations of the denominations of the notes and the difference between the white and black keys corresponding to the elevation or abasement of the notes. For this purpose especial and correspondingly-marked key-plates may be provided, Fig. 4. The arrows indicate the white or lower keys from which the upper keys are derived. For covering the black or upper keys of a piano there may be used key-plates or key-molds $a^2$, Fig. 5, having a concave form in cross-section, so that the key-plates will not fall down or slip off the upper keys.

What we claim is—

1. A musical-game apparatus composed of a set of independent key-plates provided with staves and notes, a pattern-card representing a keyboard with the notes marked thereon, and a base-plate, substantially as specified.

2. A musical-game apparatus composed of a series of independent key-plates provided with staves and notes and being adapted to be placed upon the keys of a musical instrument and a pattern-card representing a keyboard with the notes marked thereon, substantially as and for the purpose specified.

Signed at Posen, Germany, this 19th day of April, 1892.

CARL GOTTLIEB FERDINAND HANKE.
  EMIL RICHTER.

Witnesses
  C. W. ERDMAN,
  CHARLES BAUMGARDT.